(12) United States Patent
Betting et al.

(10) Patent No.: US 6,513,345 B1
(45) Date of Patent: Feb. 4, 2003

(54) NOZZLE FOR SUPERSONIC GAS FLOW AND AN INERTIA SEPARATOR

(75) Inventors: Marco Betting, Rijswijk (NL); Theodoor Van Holten, Delft (NL); Cornelis Antonie Tjeenk Willink, Rijswijk (NL); Johannes Miguel Henri Maria Van Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/869,506

(22) PCT Filed: Dec. 29, 1999

(86) PCT No.: PCT/EP99/10496

§ 371 (c)(1),
(2), (4) Date: Jun. 28, 2001

(87) PCT Pub. No.: WO00/40338

PCT Pub. Date: Jul. 13, 2000

(51) Int. Cl.7 .................................................. F25J 3/00
(52) U.S. Cl. .............................. 62/637; 62/116; 62/500; 62/910
(58) Field of Search ........................... 62/637, 910, 116, 62/500

(56) References Cited

U.S. PATENT DOCUMENTS

| | | | |
|---|---|---|---|
| 3,185,181 A | 5/1965 | Demyan | 138/37 |
| 3,544,170 A | 12/1970 | Bowles | 302/28 |
| 3,559,373 A | * 2/1971 | Garrett | 62/910 |
| 3,616,596 A | 11/1971 | Campargue | 55/17 |
| 3,626,665 A | 12/1971 | Fenn et al. | 55/17 |
| 3,725,271 A | 4/1973 | Giannotti | 210/65 |
| 3,892,070 A | 7/1975 | Bose | 60/279 |
| 3,894,851 A | 7/1975 | Gorman | 55/94 |
| 4,292,050 A | 9/1981 | Linhardt et al. | 55/1 |
| 4,541,845 A | 9/1985 | Michel-Kim | 55/17 |
| 5,261,242 A | 11/1993 | Lardinois | 62/11 |
| 5,682,759 A | * 11/1997 | Hays | 62/910 |

FOREIGN PATENT DOCUMENTS

| | | | |
|---|---|---|---|
| EP | 0496128 A1 | 7/1992 | .......... B01D/55/24 |
| GB | 2 037 610 A | 7/1980 | |
| JP | 2-17921 | 1/1990 | .......... B01D/53/24 |
| SU | 593 717 | 2/1976 | .......... B01D/45/06 |
| SU | 1 172 540 | 3/1992 | |
| SU | 1 768 242 | 10/1992 | .......... B01D/45/12 |
| WO | 1103130 | 2/1968 | ............ B01D/5/00 |

* cited by examiner

*Primary Examiner*—Ronald Capossela

(57) ABSTRACT

A nozzle of converging-diverging shape for creating mist flow at supersonic velocity comprising: a throat having a characteristic diameter $D^*$; an inlet having a characteristic diameter $D1$, positioned a distance $L1$ upstream of the nozzle throat; and an outlet having a characteristic diameter $D2$, positioned a distance $L2$ downstream of the nozzle throat, wherein the ratio of $L2/(D2-D^*)$ is larger than 4, but smaller than 250; an inertia separator based thereon, and a method for supersonic separation of one or more components of a predominantly gaseous stream.

14 Claims, 1 Drawing Sheet

NOZZLE FOR SUPERSONIC GAS FLOW AND AN INERTIA SEPARATOR

FIELD OF THE INVENTION

Figure 1:
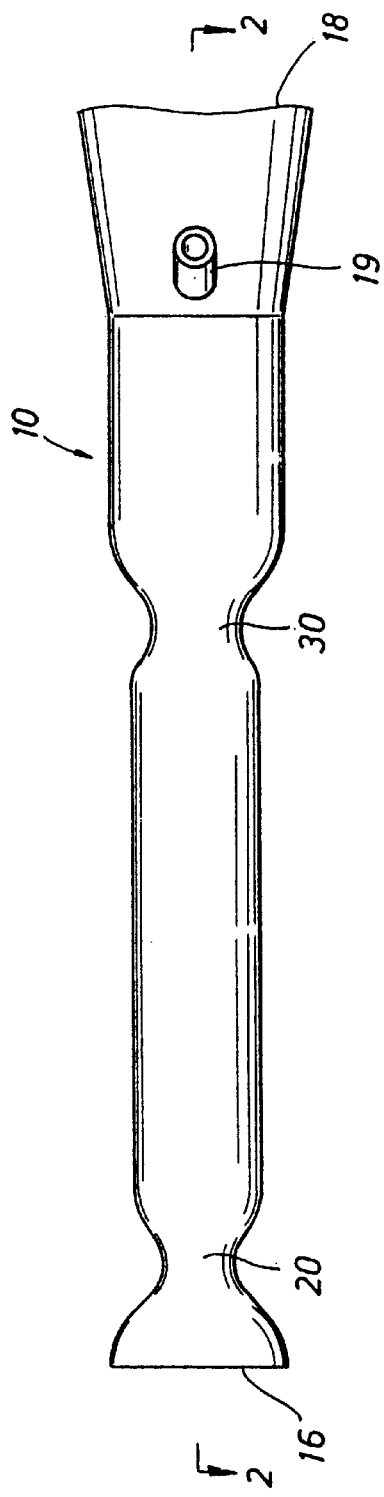
Figure 2:
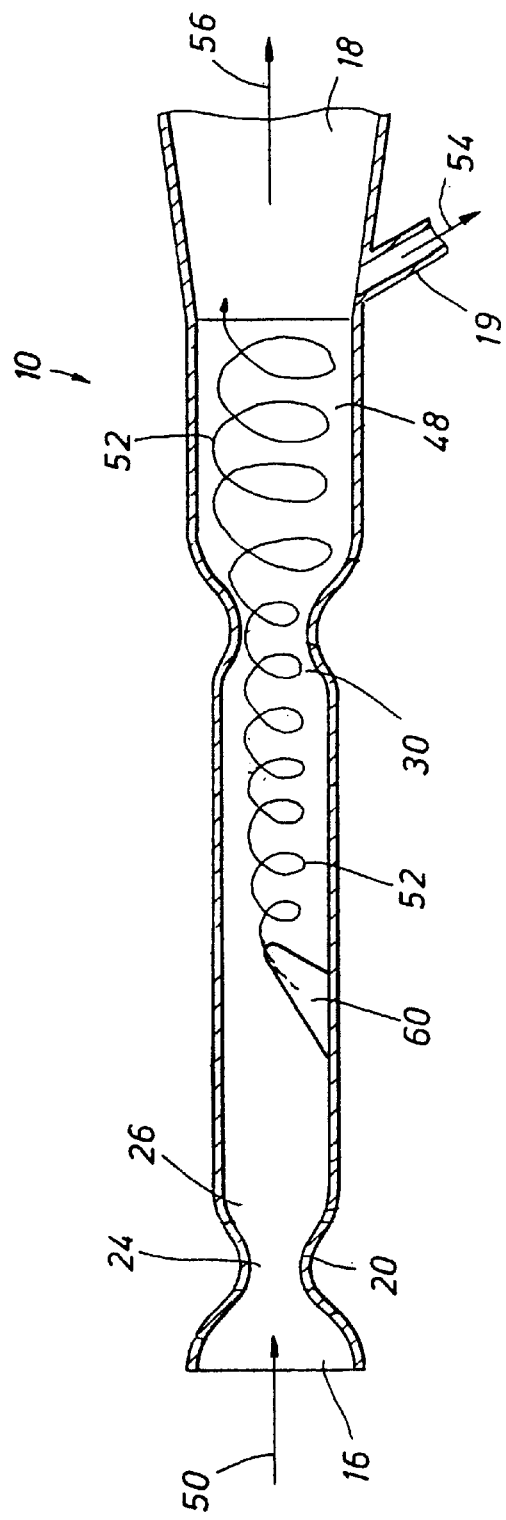

The present invention relates to a nozzle of converging-diverging shape for creating mist flow at supersonic velocity, an inertia separator based thereon, and a method for the supersonic separation of a component of a predominantly gaseous stream. More in particular, the invention relates to the separation of one or more components from said stream by condensation of the selected components and subsequent separation thereof.

BACKGROUND OF THE INVENTION

Separation can find applications in different industrial settings, such as in the oil and gas industry, in the chemical industry, in the paint industry, and a wide variety of other industries. Separation can be used in various industrial processes such as, for example, in removal of carbon dioxide from flue gas, in air-conditioning (water removal) and in the drying natural gas before its distribution into a network of pipelines.

Numerous methods and apparatus exist for separating components from a gaseous or other fluids. Examples of conventional separation apparatus include distillation columns, filters and membranes, settling tanks, centrifuges, electrostatic precipitators, dryers, chillers, cyclones, vortex tube separators and adsorbers. However, there are disadvantages and/or problems associated with each of these conventional apparatus which may make them undesirable for certain applications. In addition, various inertia separators have been described in the art, equipped with a supersonic nozzle.

JP-A-02,017,921 refers to the separation of a gaseous mixture through the use of supersonic flow. The device includes a swirler positioned upstream of a supersonic nozzle. The swirling fluid stream then passes through an axially symmetric expansion nozzle to form fine particles. The swirl is maintained over a lengthy axial distance, creating a large pressure drop. In order to separate a component from the three component gas flow, a large upstream swirl must be initially provided by the swirler and a significant amount of energy therefore must be input to the system.

U.S. Pat. No. 3,559,373 refers to a supersonic flow separator including a high pressure gas inlet, a rectangularly-shaped throat, and a U-shaped rectangular-cross sectional channel. The channel includes an outer curved permeable wall. A gas stream is provided to the gas inlet at subsonic speeds. The gas converges through the throat and expands into the channel, increasing the velocity to supersonic speed. The expansion of the flow in the supersonic region results in droplet coalescence and the larger droplets pass through the outer permeable wall and are collected in a chamber. The separation force, i.e., the force necessary to separate out the various phases of the flow stream, is dependent on the radius of the curvature of the channel. The radius of the curvature of the channel, however, is necessarily limited to prevent normal shock waves. Therefore, the shape of the device described in U.S. Pat. No. 3,559,373 inhibits the force available for separating out liquid droplets from the flow stream. Further, liquid droplets are not collected across the area of the channel.

EP-A-0,496,128 refers to a method and device for separating a gas from a gas mixture. The device includes a cylinder which converges to a nozzle and then diverges into a swirl zone. Gas enters an inlet port of the cylinder at subsonic speeds and flows through a converging section of the nozzle. The flow expands out of the converging section into the diverging section of the cylinder at supersonic velocity. A pair of deltoid plates impart a swirl to the supersonic flow. The combination of the supersonic velocities and the swirl assist in condensing and separating a condensed component from the gaseous components of the flow stream. An outlet pipe is positioned centrally within the cylinder to allow discharge of the gaseous components of the flow stream at supersonic velocity. The liquid components continue on through a second diverging section, which drops the velocity to subsonic, and through a fan, ultimately exiting the cylinder through a second outlet.

International application No. WO 99/01194 describes a similar method and corresponding device for removing a selected gaseous component from a stream of fluid containing a plurality of gaseous components. This device is equipped with a shock flow inducer downstream of the collecting zone so as to decrease the axial velocity of the stream to subsonic velocity. Application of a shock wave in this manner results in a more efficient separation of the formed particles.

These references describe various supersonic inertia separators, however, without a detailed description of the nozzle to be used.

Designs of nozzles suitable for inertia separators are shaped different from those that are used in jet engines, thrusters, etc. Both use convergent-divergent nozzles (Delaval Nozzle), which implies that in the meridian section a minimum diameter exists, referred to as the 'nozzle throat'. However, the diverging section of nozzles used as a thrust device can be a simple conical diverging section (cf. Perry's Chemical Engineers' Handbook, 5–32). The shape of the diverging section to obtain supersonic mist-flow (i.e., a two phase comprising liquid/solid particles of condensed components of the stream present as fine particles transported with the gas phase) must be of a special shape; methods of design are given by Liepmann and Roshko (Elements of Gasdynamics, Wiley, New York, 1957, p. 284) the contents of which are incorporated by reference.

U.S. Pat. No. 5,261,242 concerns a process and apparatus for separation of solid particles or liquefied substance from their carrier fluid, using an inertial separator and, upstream of it, when needed, a nozzle system whose general function is to transform the fluid carrying the substance to extract into a rapid flow allowing to separate the substance as result of the inertial effect. According to this patent, a converging-diverging nozzle is to be applied having a particular profile (depicted in FIG. 2 of the US patent). The nozzle is said to be useful in the sector of energy recovery, industrial drying, drying of fluids carrying liquefiable substances and lowering of dew points of gases, of gas purification technology and aerosols separation and gas separation. Accordingly, this patent describes a nozzle of a convergent-divergent type having a channel comprising, in the direction of the fluid flow, upwards and downwards from a throat portion respectively a converging and a diverging channel portion, and wherein said nozzle channel has a profile in the vicinity of said throat portion upwardly and downwardly therefrom, shaped to cause the pressure and the flow rate in said zone to remain substantially constant over the nozzle channel axis.

However, it remains unclear what shape and dimensions this nozzle must have to achieve a separation efficiency of at least 15% (minimum separation efficiency for say air conditioning), preferably at least 50% (minimum separation efficiency for say natural gas treatment), and/or to provide separable particles of say 0.1 to 2.5 micrometer diameter.

SU-A-1768242 and SU-A-1722540 also disclose supersonic inertia separators without giving attention to the effect of the geometry of the nozzle on the particle growth and performance of the separator.

What is needed is a method and device which overcomes the disadvantages and insufficiencies of the prior separation methods to create and grow particles of a readily separable size with a limited amounts of external energy, rotating parts and pressure drop.

SUMMARY OF THE INVENTION

The present invention provides a nozzle of converging-diverging shape for creating mist flow at supersonic velocity comprising:

- a throat having a characteristic diameter D*;
- an inlet having a characteristic diameter D1, positioned a distance L1 upstream of the nozzle throat; and
- an outlet having a characteristic diameter D2, positioned a distance L2 downstream of the nozzle throat, wherein the ratio of L2/(D2−D*) is larger than 50, but smaller than 220.

In the above definition and throughout this specification the throat is the part of the nozzle having the smallest flow area (dD/dx=0, wherein 'dD' is the incremental change in characteristic diameter and dx refers to the incremental change of position along the axial coordinate); the inlet is the subsonic inflow plane of the nozzle where it starts to converge (dD/dx£0), and the outlet is the supersonic outflow plane of the nozzle where it stops to diverge (dD/dx$^{3}$0). Likewise, the expression "characteristic" is used in the above definition and throughout this specification to define the diameter independent of the shape (circular, rectangular, etc.) of the cross-section i.e. the section normal to the nozzle axis. The characteristic diameter equals 4 times the cross-sectional area divided by the circumference.

The invention also provides an inertia separator for supersonic separation of a component of a predominantly gaseous stream, comprising a nozzle as described above, and a separation section downstream thereof having at least one outlet for the component that is to be separated, and at least one outlet for the remaining gaseous stream.

With the expression "predominantly gaseous stream" in the above definition and throughout this specification is meant a stream that may have a minor amount of liquid or solid content, for example, a gas stream comprising 0–10%wt liquid and/or solid content.

BRIEF DESCRIPTION OF THE DRAWINGS

FIG. 1 is a side view of an inertia separator constructed in accordance with one possible embodiment of the invention.

FIG. 2 is a cross-sectional view of the inertia separator of FIG. 1.

Finally, the invention also-provides a method for the supersonic separation of one or more components of a predominantly gaseous stream further comprising a carrier gas, using an inertia separator as described above.

BRIEF DESCRIPTION OF THE INVENTION

Use of a nozzle as described herein before results in the formation of particles of separable size. These particles form by the condensation (and solidification in some instances), of the one or more components from the predominantly gaseous stream by the decrease in temperature due to the nearly isentropic expansion thereof. (The expression 'isentropic' means 'of equal or constant entropy with respect to either space or time'.)

The invention is thus based on a range of supersonic nozzles with prefixed length/diameter ratios, realizing that the effectiveness of an inertia separator is dependent on the diameter of the particles, and the diameter of the inertia separator. Suitable nozzles have a length/diameter ratio of 50<L2/(D2−D*)<220, most preferably 100<L2/(D2−D*)<200. If this ratio is too small, then either the particle sizes become too small to be subjected to inertia forces or the expansion is far from isentropic. If this ratio is too large, then the expansion will not continue to supersonic conditions. Nozzles that have been found to be particularly suitable, achieving isentropic efficiencies, $\eta>15\%$, have a length/diameter ratio L2/D* that is smaller than 300.

The nozzle cross section may have any shape, such as circular, rectangular or more complex. From a production point of view, the former two are preferred.

The nozzle of the present invention may be used in inertia separators having a curved separation section (as described in for instance GB-A-1,103,130; U.S. Pat. Nos. 4,292,050; 5,261,242 or 3,894,851 the contents of which are included by reference) and in inertia separators that rely on centrifugal separation action (JP-A-02,017,921; EP-A-0,496,128 or WO 99/011994, the contents of which are included by reference). Accordingly, an inertia separator according to the present invention comprises a nozzle as defined above and a separation section downstream thereof having at least one outlet for the or each component to be separated and at least one outlet for the remaining gaseous stream.

Preferred inertia separators are those that rely on centrifugal separation action. In such separators liquid or solid particles drift to the outer radial sections of the stream by the swirling motion of that stream (vortex flow). Preferably these inertia separators have a vortex inducer upstream to the separation section and downstream of the nozzle, in the part of the separator referred to as the passageway. However, it may also be possible to have a vertex inducer before the nozzle (subsonic) or even in the nozzle (either subsonic or transsonic) Particularly preferred are the inertia separators described in EP-A-0,496,128 and WO 99/01194, wherein the vortex inducer comprises one or more delta-shaped elements protruding radially inwardly from the inner wall of the inertia separator, the leading edge and plane of which makes an angle of incidence not larger than 10° with the axial coordinate of the inertia separator. It should be understood that the vortex can be formed by various other methods such as, for example, varying the geometry of the passageway to alternatively include walls having curves or dents; using a twisting coil as the passageway; using a twisting coil located inside the passageway; having a non axi-symmetrical passageway; using a curved passageway with a porous wall; using a spirally wound shape to create a vortex flow before entry into the nozzle; or using a tangential vortex tube. In addition, various different wing geometries may be used to induce a vortex in the supersonic passageway such as a distorted wing, a cambered wing, or a winglet. Other examples to create a vortex include introducing a swirl upwards of nozzle (in a sub-sonic region) through, for example, a wing, a stator wheel, or a tangential inlet. The vortex may also be formed in the passageway by an externally supplied rotational force such as, for example, rotating tube or rod (i.e., the magnus effect) Additionally, local heating and/or cooling of the supersonic passageway may be used such that a vortex is created (i.e., distribution of entropy and enthalpy).

To separate condensed particles in a swirl, the droplets will have to reach the wall of the tube, that is, they need to radially travel up to half the internal diameter of the passageway of a swirl separation apparatus. However, if the droplets formed in the supersonic nozzle are too small, they will not be able to reach the wall but instead will first reach an equilibrium point between centrifugal force of the swirl and inward drag forces present in the passageway.

It has been found that the cooling speed (dT/dt) can vary from about −100,000° K/s to about −1,000° K/s, preferably from about −50,000° K/s to about −2,500° K/s to achieve separable particles having a size of from about 0.1 micrometers to about 2.5 micrometers, preferably from about 0.5 micrometers to about 1.0 micrometers. For example, the following cooling speed and droplet size correlation has been found for an ambient air/water mixture:

| Cooling speed: | Droplet mean diameter: |
|---|---|
| −50,000° K./sec | 0.2 micrometer |
| −40,000° K./sec | 0.5 micrometer |
| −20,000° K./sec | 1.0 micrometer |

It has also been found possible to define supersonic nozzles in terms of the relation between cooling speed (dT/dt in °K/s) versus D2 (in mm). Thus, good results have been found with nozzles wherein the double log product, log(D2)*log(dT/dt), is in the range of from 3 to 50, more preferably in the range of from 3 to 30, preferably in the range of from 3 to 15. 'Cooling speed' may be determined experimentally, or be designed by changing the nozzle geometry.

Ideally, the inertia separator is equipped with a shock wave generator, for instance a diffuser (i.e., a nozzle of diverging/converging shape), downstream of the nozzle. The shock wave generator may be located upstream or downstream of the separation section.

The inventors have found that the separation efficiency is significantly improved if collection of the particles in the collecting zone takes place after a shock wave, i.e. in subsonic flow rather than in supersonic flow. The shock wave dissipates a substantial amount of kinetic energy of the stream and thereby strongly reduces the axial component of the fluid velocity while the tangential component (caused by the vortex generator) remains substantially unchanged. As a result the density of the particles in the radially outer section of the collecting zone is significantly higher than elsewhere in the conduit where the flow is supersonic. It is believed that this effect is caused by the strongly reduced axial fluid velocity and thereby a reduced tendency of the particles to be entrained by a central "core" of the stream where the fluid flows at a higher axial velocity than nearer the wall of the conduit. Thus, in the subsonic flow regime the centrifugal forces acting on the condensed particles are not to a great extent counter-acted by the entraining action of the central "core" of the stream, so that the particles are allowed to agglomerate in the radially outer section of the collecting zone from which they are extracted.

In a preferred apparatus, the shock wave is created by inducing the stream of fluid to flow through a diffuser. While any diffuser can be used, a suitable diffuser is a supersonic diffuser. In an advantageous embodiment, the collecting zone is located adjacent the outlet end of the diffuser.

Additionally, the shock wave can be formed by other means of, such as, for example, by the placement of a stem, cone, vane or the like placed in the interior of the conduit to create an impediment to flow and therefore a shock wave.

The final part of the inertia separator downstream of the passageway comprises the separation section. While it is preferred to use an inertia separator equipped with a vortex generator, and hence also equipped with a collection pipe for collecting the condensed matter from the gaseous stream (cf. EP-A-0,496,128 and WO 99/01194), it should be understood that the invention is not so limited. For example, the condensed separated component may be collected by extraction of the condensed component from a static wall, by flow of the condensed component through slits or perforations formed in the wall of the separator; by extraction of the liquid layer and boundary layer by means of porous walls (i.e., reducing stagnation temperature increase); by capillary force to absorb liquids through the use of micro-porous materials; by boundary layer extraction with solvent circulation; by solubility/absorption through membranes; by extraction from rotating wall, such as, for example, a rotating drum with slits/perforations/porous material, or by impactors (i.e., wake, filter or cone impactors).

The inertia separator described herein above may be used for the same purposes as the inertia separators described in the references cited in this specification. It is particularly suitable for the treatment of natural gas.

The term "natural gas" used herein generally refers to gas produced from underground accumulations having a widely varying composition. Apart from hydrocarbons, natural gas generally includes water, nitrogen, carbon dioxide and sometimes a small amount of hydrogen sulfide. The principal hydrocarbon in natural gas is methane, the lightest and lowest boiling member of the paraffin series of hydrocarbons. Other constituents are ethane, propane, butane, pentane, hexane, heptane, etc. The lighter constituents, e.g., $C_2$–$C_4$ hydrocarbons, are in a gaseous phase at atmospheric temperatures and pressures. The heavier constituents are in a liquid phase at atmospheric temperature and pressure and in the gaseous phase at elevated temperatures during production from the subsurface. Natural gas containing such heavier constituents is known as "wet gas." Natural gas containing none or only a small proportion of the heavier liquid hydrocarbons is known as "dry gas."

In FIGS. 1 and 2, one possible embodiment of the invention is depicted. An inertia separator 10 is shown having a nozzle 20, a wing 60 which acts to induce a vortex, a diffuser 30, and a separation section 48.

The nozzle 20 includes an inlet 16, a throat 24, and an outlet 26. As input fluid stream 50, a predominantly gaseous stream, passes through the nozzle 20, the temperature of input fluid stream 50 drops, resulting in the condensation of one or more components within input fluid stream 50.

Subsequently, the fluid stream 50 contacts the wing 60, causing the fluid stream 50 to begin to swirl. The swirling fluid stream 50 is shown schematically by a swirl flow 52. The swirling motion of the swirl flow 52 causes particles condensed from the fluid stream 50 to begin moving radially outward. When the swirl flow 52 passes through the diffuser 30, a shock wave is generated, and the axial velocity of the swirl flow 52 is greatly reduced; consequently, the collection of particles in the outer radial sections of fluid stream 50 is enhanced.

As the fluid stream 50 passes through the separation section 48, the separated component 54 exits the separation section 48 through a separated component outlet 19. The remaining gaseous stream 56 exits the separation section 48 through a remaining gaseous stream outlet 18.

The invention is further explained with reference to the following examples. It should be understood that the same relationship illustrated for an air-water mixture would also hold for other gaseous mixtures. This invention is not intended to be limited by the particular examples described below.

EXAMPLE 1

An exemplary conduit for separating water vapour from air at ambient conditions is described. The apparatus can be used to remove water vapour form air in central air-conditioning installations or exhaust air from dry-chambers. Typically 15% to 30% of the water vapour must be separated in order to achieve the desired humidity. The air flow-rates in these applications are typically in the order of 10,000 to greater than 100,000 m$^3$/hr.

In the apparatus, air was pressurized to 1.4 bar by a blower and then cooled to between 25–30° C. where the air is near water saturation (RV=90%). The air was then fed to the apparatus according to the present invention where the water liquids were separated with a small amount of slip air coming along with the water liquid stream.

The apparatus of the present example had a tubular flow duct although similar results can be achieved for rectangular or asymmetric duct cross sections. The inlet conditions to the apparatus are summarized below:

| | | |
|---|---|---|
| 1. Mass flow rate: | 1.2 kg/s | |
| 2. Inlet pressure: | 140 KPa (1400 mbar(a)) | |
| 3. Inlet temperature: | 25° C. | |
| 4. Inlet humidity: | 90% | |

The apparatus achieved the condensation of the water vapour, resulting in a flow containing a large number of water droplets, typically $10^{13}$/m$^3$. The final temperature and pressure were found to be −28° C. and 68 KPa (680 mbar (a)), resulting in a water vapour fraction that was negligibly small.

The throat diameter of the nozzle was on the order of 70 mm. The inlet diameter was 300 mm. The nozzle outlet diameter was 80 mm so as to obtain supersonic flow conditions, with typically Mach number M=1.15. The resulting lengths (L1 and L2) of the nozzle were:

| | | |
|---|---|---|
| L1: | 700 mm: | from nozzle inlet to nozzle throat |
| L2: | 800 mm: | from nozzle throat to nozzle outlet |

The wall roughness was chosen to be small, i.e., 1 micrometer, to decrease frictional losses. Depending on the application, any rigid material can be used for the nozzle device, as long as the above mentioned design parameters are taken into account.

The inertia separator also included a separation section comprising a slightly conical vortex tube and, downstream thereof, a diffuser.

In the vortex tube a wing-like, swirl imparting internal was present. At the edge of this wing a vortex was created on the upper (low-pressure) side and shed from the plane, preferably at the trailing edge. The cord of the wing was attached to the inner wall of the vortex tube. The inlet diameter of the vortex tube was 80 mm, which increased linearly to 84 mm over a length of approximately the cord length of the wing, after which it remained constant. The length from the wing apex to the wing trailing edge was on the order of 300 mm, as was the length from the wing trailing edge to the diffuser.

The wing span at the trailing edge was about 60 mm and at an incidence of the wing cord to the axis of the tube of 8°. The sweepback angle of the leading edge was 87° and the sweepback angle of the trailing edge was about 40°. The edges of the wing were sharp having a top-angle of less then 3°. The plane of the wing was flat and its profile was extremely slender, due to the small thickness, typically about 4 mm at the root. As a result, the circulation or integral vorticity was approximately 16 m$^2$/s.

In a drainage section, liquids are withdrawn out of the vortex tube. The drainage section is not a sharp distinguished device but is an integral part of the vortex tube, by means of slits, porous materials, holes in the vortex tube walls; or is an integral part of the diffuser by means of a vortex finder (co-axial duct). In this example, a vortex finder was used and was placed centrally in the duct after the shock wave, which was present directly after the vortex tube in the first diffuser part.

The diffuser outlet diameter amounted to 90 mm and the vortex finder inlet diameter amounted to 85 mm. The half divergence angle of the diffuser was 4°. The vortex finder outlet diameter in this case was 300 mm, and its length was 1500 mm.

The performance of the device was measured by means of two humidity sensors both at the air inlet and dried air outlet, corrected by temperature and pressure measurements. The typical values of the inlet water fractions were 18–20 grams of water vapour per kg dry air. The typical values of the outlet water fractions were 13–15 grams of water vapour per kg dry air. This can be expressed as a separation efficiency of about 25%.

EXAMPLES 2–4

Tests were conducted with nozzles of various dimensions to remove heavy hydrocarbons from a natural gas stream. The results, together with that of Example 1 are set out in Table 1.

TABLE 1

| Example | 1 | 2 | 3 | 4 |
|---|---|---|---|---|
| Feed | Air +<br>Water vapour | Natural<br>gas | Natural<br>gas | Natural<br>gas |
| Inlet pressure MPa (absolute) | .14 | 9.8 | 9.8 | 9.8 |
| Inlet temperature | 25° C. | −6° C. | −6° C. | −6° C. |
| Flow | 1.2 kg/s | 3 * 10$^6$ (n)m$^3$/day | 3 * 10$^6$ (n)m$^3$/day | 1 * 10$^6$ (n)m$^3$/day |
| D1  mm | 300.0 | 150.0 | 150.0 | 100.0 |
| D*  mm | 70.0 | 42.9 | 41.8 | 24.4 |
| D2  mm | 80.0 | 45.0 | 45.0 | 25.6 |
| L1  mm | 700.0 | 437.2 | 86.9 | 232.3 |
| L2  mm | 800.0 | 440.8 | 114.7 | 234.2 |
| L2/(D2 − D*) | 80 | 210 | 35.8 | 195 |
| dT/dt  ° K./s | 19,000 | 17,000 | 100,000 | 32,000 |
| Particle diameter micrometer | 1.20 | 0.30 | 0.08 | 0.24 |
| Log(D2) * log (dT/dt) | 8.14 | 6.99 | 8.27 | 6.34 |
| Separation efficiency % | 25 | 55 | 22 | 68 |

It should be understood that various alternatives to the embodiments of the invention described herein may be employed in practicing the invention. For example, although the operation of the present invention has been described with respect to separation of a condensed liquid component from a gaseous stream, the present invention applies equally well to separation of liquid components from a liquid stream, separation of liquid components from a gaseous stream and separation of solid particles from a liquid or gas stream. Similarly, the processes described above are examples of the many processes that could be used.

What is claimed is:

1. A nozzle of converging-diverging shape comprising:
   a throat having a characteristic diameter $D^*$;
   an inlet having a characteristic diameter $D1$, positioned a distance $L1$ upstream of the nozzle throat; and
   an outlet having a characteristic diameter $D2$, positioned a distance $L2$ downstream of the nozzle throat, wherein the ratio of $L2/(D2-D^*)$ is larger than 4, but smaller than 250.

2. A nozzle as claimed in claim 1, wherein the ratio of $L2/(D2-D^*)$ is larger than 100, but smaller than 200.

3. A nozzle as claimed in claim 2, wherein the ratio of said length of said nozzle $L2$ to the diameter of said nozzle $D^*$ is less than 300.

4. An inertia separator for supersonic separation of a component of a predominantly gaseous stream, comprising a nozzle, the nozzle comprising:
   a throat having a characteristic diameter $D^*$;
   an inlet having a characteristic diameter $D1$, positioned a distance $L1$ upstream of the nozzle throat; and
   an outlet having a characteristic diameter $D2$, positioned a distance $L2$ downstream of the nozzle throat, wherein the ratio of $L2/(D2-D^*)$ is larger than 50, but smaller than 220; and
   a separation section downstream thereof having at least one outlet for the component that is separated and at least one outlet for the remaining gaseous stream.

5. An inertia separator as claimed in claim 4, having a vortex inducer upstream to the separation section and downstream of the nozzle.

6. An inertia separator as claimed in claim 5, wherein the vortex inducer comprises one or more delta-shaped elements protruding radially inwardly from the inner wall of the inertia separator, the leading edge and plane of which makes an angle of incidence not larger than 10° with the axial coordinate of the inertia separator.

7. An inertia separator as claimed in claim 4, having a shock wave generator downstream of the nozzle.

8. An inertia separator as claimed in claim 7, wherein the shock wave generator is a diffuser (nozzle of diverging/converging shape) located upstream or downstream of the separation section.

9. A method for the supersonic separation of a component of a predominantly gaseous stream, using an inertia separator comprising a nozzle, the nozzle comprising:
   a throat having a characteristic diameter $D^*$;
   an inlet having a characteristic diameter $D1$, positioned a distance $L1$ upstream of the nozzle throat; and
   an outlet having a characteristic diameter $D2$, positioned a distance $L2$ downstream of the nozzle throat, wherein the ratio of $L2/(D2-D^*)$ is larger than 50, but smaller than 220; and
   a separation section downstream thereof having at least one outlet for the component that is separated and at least one outlet for the remaining gaseous stream.

10. A method as claimed in claim 9, wherein the predominantly gaseous stream comprises a mixture of methane and higher hydrocarbons and/or water vapour.

11. A method as claimed in claim 9, wherein the predominantly gaseous stream comprises a flue gas and said component to be removed is selected from the group of $CO_2$, $N_2$, $NO_x$ and $H_2S$.

12. A method as claimed in claim 9, wherein said component is separated as droplets having a particle size of from 0.1 micrometers to 2.5 micrometers.

13. A method as claimed in claim 9, wherein the change in temperature over the length $L2$ of said nozzle is from $-100,000°$ K/s to $-1,000°$ K/s.

14. A method as claimed in claim 9, where said component is separated as droplets having a particle size of from 0.5 micrometers to 1.0 micrometers.

* * * * *